(12) United States Patent
Qi et al.

(10) Patent No.: US 6,836,123 B1
(45) Date of Patent: Dec. 28, 2004

(54) SENSOR FOR ELECTRO-ACTIVE MATERIALS

(75) Inventors: Zhigang Qi, North Arlington, NJ (US); Chunzhi He, Westfield, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 88 days.

(21) Appl. No.: 10/122,170

(22) Filed: Apr. 15, 2002

(51) Int. Cl.[7] .................. G01N 27/02; G01R 27/26
(52) U.S. Cl. ............. 324/446; 324/663; 324/664; 324/686; 324/689
(58) Field of Search ................ 324/446, 689, 324/663, 664, 686; 205/787; 204/421; 429/90–93, 22, 30, 105

(56) References Cited

U.S. PATENT DOCUMENTS

| | | | |
|---|---|---|---|
| 4,810,597 A | 3/1989 | Kumagai | 429/22 |
| 4,939,467 A | 7/1990 | Nogami et al. | 324/663 |
| 5,151,660 A * | 9/1992 | Powers et al. | 324/689 |
| 5,196,801 A | 3/1993 | Nogami et al. | 324/663 |
| 5,361,035 A * | 11/1994 | Meitzler et al. | 324/663 |
| 6,306,285 B1 | 10/2001 | Narayanan et al. | 208/787 |
| 6,488,837 B1 * | 12/2002 | Ren et al. | 205/787 |

FOREIGN PATENT DOCUMENTS

WO WO 98/45694 10/1998

OTHER PUBLICATIONS

Barton et al., "A methanol sensor for portable direct methanol fuel cells",J. Electochem. Soc., vol. 11, pp. 3783–3788, Nov. 1998.
Narayanan et al, "Design and operation of an electrochemical methanol concentration sensor for direct methanol fuel cell systems", Electrochemical and Solid–State Letters, vol. 3, pp. 117–120, Mar. 2000.

* cited by examiner

*Primary Examiner*—Anjan Deb
*Assistant Examiner*—John Teresinski
(74) *Attorney, Agent, or Firm*—Mark Levy & Associates; David L. Banner

(57) ABSTRACT

A sensing device is featured that electrochemically measures methanol concentration. The sensing device has a flexible composite of layered materials wrapped about a flexible tube having aperture contact with a methanol flow stream. The layered materials sequentially wrapped on the tube are: a polytetrafluoroethylene insulation sheet; an electrically conducting mesh representing the anode current collector; a carbon-based material representing an anode diffusion medium; a catalyst-coated membrane with both sides coated by catalysts such as Pt/Ru and Pt; a carbon-based material serving as the cathode diffusion medium; and an electrically conducting mesh representing the cathode current collector.

12 Claims, 10 Drawing Sheets

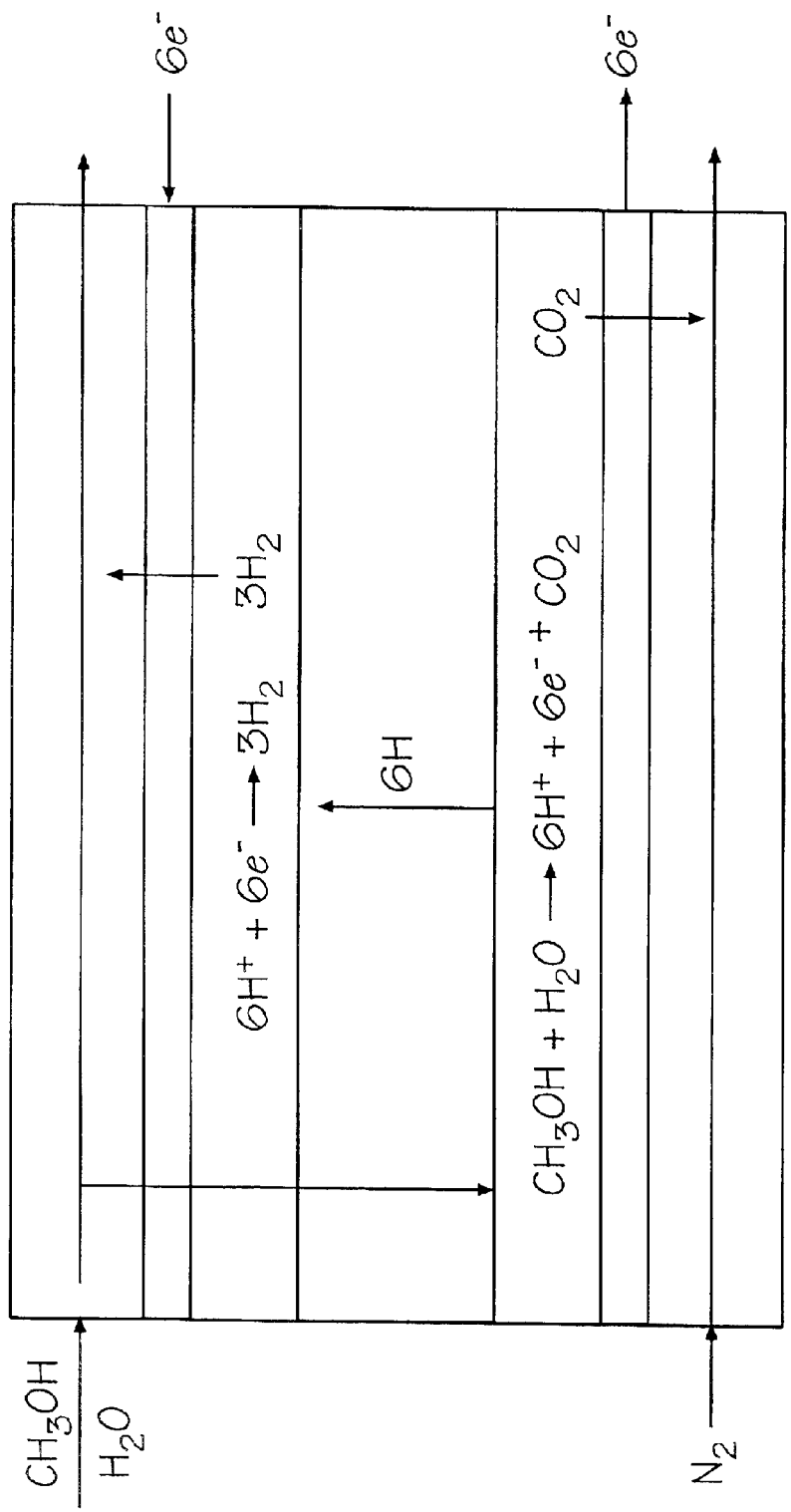

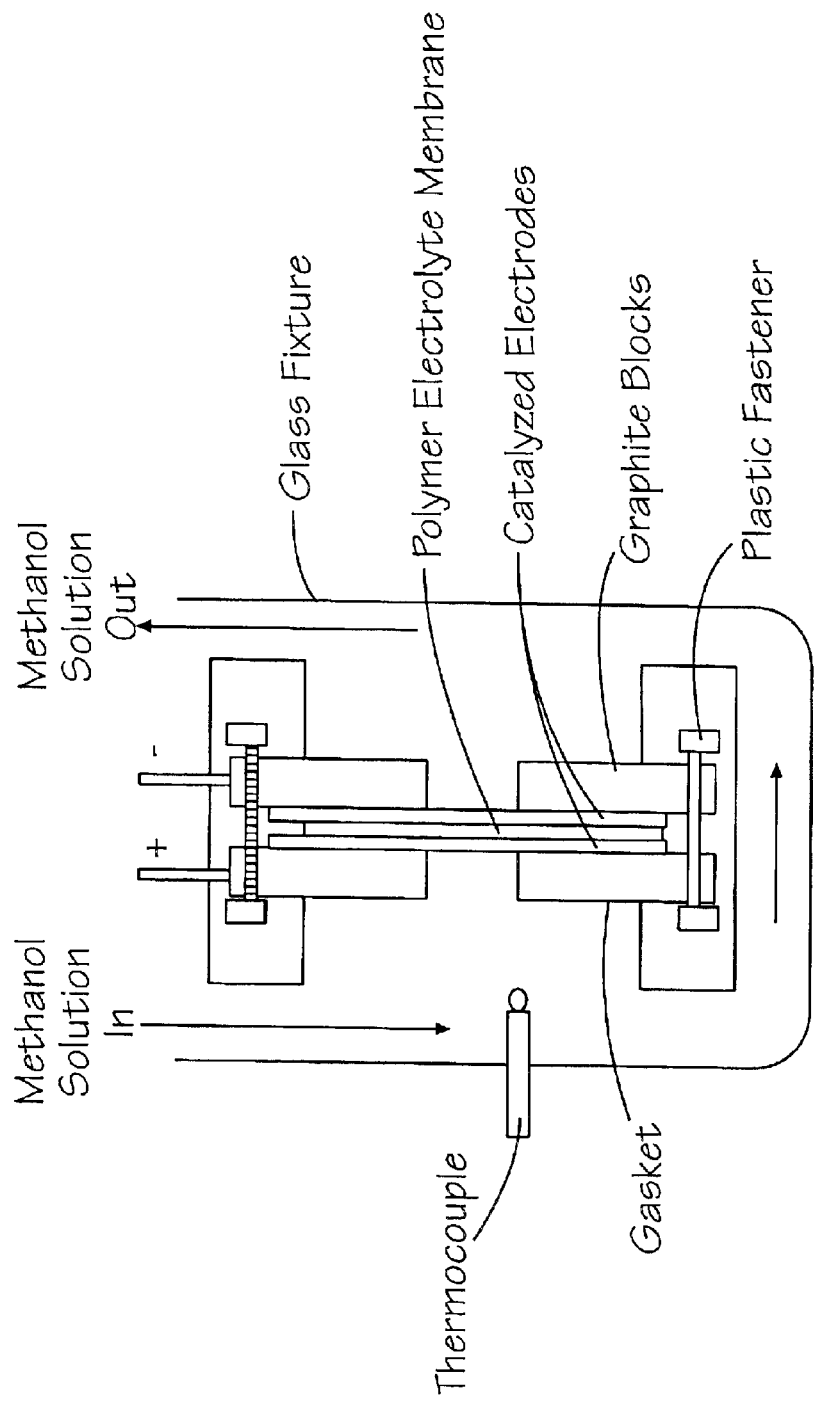
Figure 1e — Prior Art

SENSOR FOR ELECTRO-ACTIVE MATERIALS

FIELD OF THE INVENTION

The present invention relates to sensors for monitoring the concentration of electro-active materials and, more particularly, it relates to a methanol concentration sensing apparatus whose construction is simple and whose response is fast, accurate, reproducible, and reliable.

BACKGROUND OF THE INVENTION

Sensing methanol concentration is not a trivial task. A few sensing mechanisms have been explored to date. In U.S. Pat. No. 4,810,597, granted to Kumagai et al on Mar. 7, 1989, the open circuit voltage change caused by the presence of methanol was used as a means to determine methanol concentration. The structure of the sensing device looked like a regular direct methanol fuel cell (DMFC). When methanol diffused through the membrane to the air cathode side, the voltage of the cathode declined. A higher methanol concentration caused more methanol to diffuse through, resulting in a lower cathode open circuit voltage. Applicants have tried to use this method to determine methanol concentration, but found the reproducibility of this technique was too poor.

Capacitance was also used as a means of monitoring methanol concentration in a mixture of gasoline and methanol, as illustrated in U.S. Pat. No. 4,939,467, granted to Nogami et al on Jul. 3, 1990, and U.S. Pat. No. 5,196,801, granted to Nogami et al on Mar. 23, 1993. Due to the difference in dielectric constants between methanol and gasoline, the capacitance between two electrodes changes with the methanol concentration. Unfortunately, since the dielectric constants of water and methanol are very close and the methanol concentration used in a DMFC is normally less than 5% wt., such a method cannot provide a reliable measure of methanol concentration in water.

In recent times, there has been appreciable effort to develop and commercialize direct methanol fuel cells. These methanol fuel cells will require a sensor to continuously monitor the concentration of the methanol solution fed to the fuel cell anode.

The electrochemical oxidation of methanol has been used by two groups of scientists to measure methanol concentration for DMFCs. FIG. 1c shows a design based on measuring the limiting current output from the oxidation of the methanol that diffuses through a Nafion 117 proton-exchange membrane, as illustrated by Barton et al in J. Electrochem. Soc., vol. 11, pp. 3783–3788, 1998, November. Methanol in the fuel diffuses through the membrane to the cathode side of the cell where it is oxidized to carbon dioxide and protons by an applied voltage, as shown by FIG. 1d. The reaction on the methanol side of the fuel cell comprises the reduction of protons to hydrogen. The protons come from the methanol oxidation occurring on the other side of the membrane, which then back diffuse through the membrane. The applied voltage is high enough so the transport of methanol through the membrane is the limiting factor in determining the current. Higher methanol concentration in the fuel will result in a higher limiting current. They demonstrated a strong correlation between the limiting current and methanol concentration up to a methanol concentration of 4 M over a temperature range of 40 to 80° C. They also stated that the transient current response to methanol concentration change indicated a response time of about 10 to 50 seconds. The variation depends primarily on temperature.

Following the same electrochemical principle, Narayanan et al illustrated a similar design in Electrochemical and Solid-State Letters, vol. 3, pp. 117–120, 2000, March, as shown in FIG. 1e. It was also illustrated in WO 98/45694, granted to Narayanan et al on Oct. 15, 1998, and U.S. Pat. No. 6,306,285, granted to Narayanan et al on Oct. 23, 2001. The major difference from Barton's design was that the methanol was oxidized by an applied voltage at the methanol side as shown in FIG. 1f. The entire sensing cell could be immersed in the methanol solution with both its anode and cathode being in contact with methanol solution. It is the polarity of the applied voltage that determines which side is anode and which side is cathode. The inventors reported a response time of less than 1 second and a nonlinear correlation between the oxidation current and methanol concentration up toga methanol concentration of ca. 2.0 M.

The sensing apparatus in both Barton's design and Narayanan's design was actually a small DMFC single cell. The reactions occurring on the electrodes are depicted below:

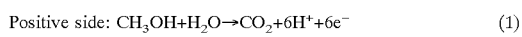
Positive side: $CH_3OH + H_2O \rightarrow CO_2 + 6H^+ + 6e^-$  (1)

Negative side: $6H^+ + 6e^- \rightarrow 3H_2$  (2)

Since both Barton et al and Narayanan et al used a flat DMFC single cell as the sensing apparatus, using these "sensors" in a real DMFC system is problematical. In Barton's design it is critical to have a good seal among all the sensing components so that methanol will arrive at the positive side only via diffusion. In Narayanan's design it is difficult to predict how the methanol solution flows over the sensing electrode surface. Furthermore, it seems to be quite difficult to incorporate such a "sensor" into a DMFC system.

The present invention comprises a methanol concentration sensing apparatus using the same electrochemical principle as Barton and Narayanan cells, but it is dramatically simpler to construct and use. The sensor is highly reliable and sensitive with a fast response time.

The sensing device comprises a flexible composite of layered materials wrapped about a flexible tube having aperture contact with a methanol flow stream. Since all the materials used are flexible and bendable, there is no problem fastening the assembly along the curled outer surface of a piece of tubing using clamps or other types of fasteners. Because of the simplicity of its design such a sensor can be fabricated in minutes. This tubing, with the fastened assembly, is easily connected to the inlet of the methanol solution flow loop for a DMFC. The sensor can actually be connected anywhere in the methanol solution flow loop. A preferred location is within the methanol solution mixing tank.

In contrast, both Barton's and Narayanan's designs have inflexible sensors, making it impossible to fasten them on a curved surface. Hence, their sensors cannot be easily adapted into the methanol solution flow loop. In addition, the engineering needed to fabricate these related-art sensing cells is much more complex.

SUMMARY OF THE INVENTION

In accordance with the present invention, a sensing device is featured that electrochemically measures methanol concentration. The sensing device comprises a flexible composite of layered materials wrapped about a flexible tube having aperture contact with a methanol flow stream. The layered materials sequentially wrapped on the tube comprise: a polytetrafluoroethylene insulation sheet; an electrically conducting mesh representing the anode current collector; a carbon-based material representing an anode diffusion medium; a catalyst-coated membrane with both sides coated by catalysts such as Pt/Ru and Pt; a carbon-based material serving as the cathode diffusion medium; and an electrically conducting mesh representing the cathode current collector.

It is one object of the present invention to provide an improved, inexpensive, and easy-to-use methanol sensor.

It is another object of this invention to provide a methanol sensor that is in direct contact with the methanol solution flow stream for the fuel cell.

It is still another object of this invention to provide a sensor for monitoring the concentration of electro-active materials.

BRIEF DESCRIPTION OF THE DRAWINGS

A complete understanding of the present invention may be obtained by reference to the accompanying drawings when considered in conjunction with the subsequent detailed description, in which:

FIG. 1b illustrates a photograph of an in situ plan view of the sensing apparatus shown in FIGS. 1 and 1a;

FIGS. 1c and 1d show a schematic front view of a related Barton sensor and its reaction locations, respectively;

FIGS. 1e and 1f respectively illustrate a schematic front view of a related Narayanan sensor and its reaction locations;

For purposes of brevity and clarity, like components and elements of the apparatus of this invention will bear the same designations or numbering throughout the figures.

DESCRIPTION OF THE PREFERRED EMBODIMENT

Generally speaking, the invention features a sensing apparatus that installs and operates in direct contact with the analyte flow stream. The sensing apparatus measures the concentration of a reactant through its electrochemical oxidation or reduction reaction. The sensing apparatus comprises a flexible composite of layered materials wrapped about a tube having an aperture providing fluid contact between the sensing apparatus and the reactant flow stream.

Figure 1:
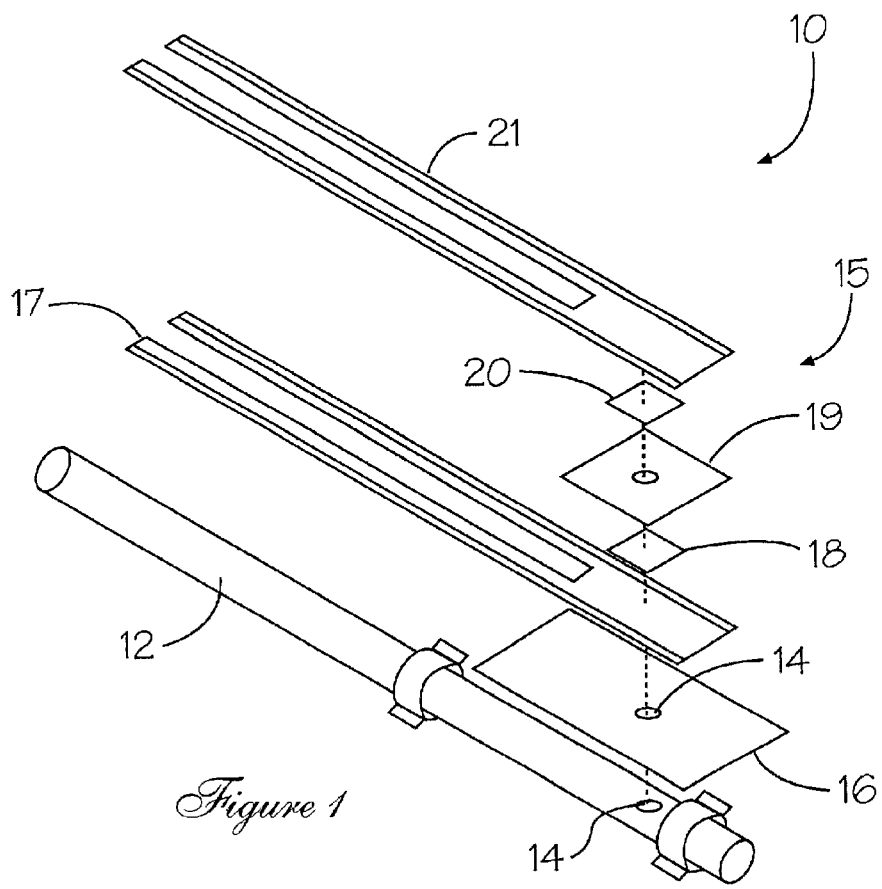
FIGS. 1 and 1a illustrate perspective, exploded, and final assembly plan views of the methanol sensing apparatus of this invention.
Figure 1A:
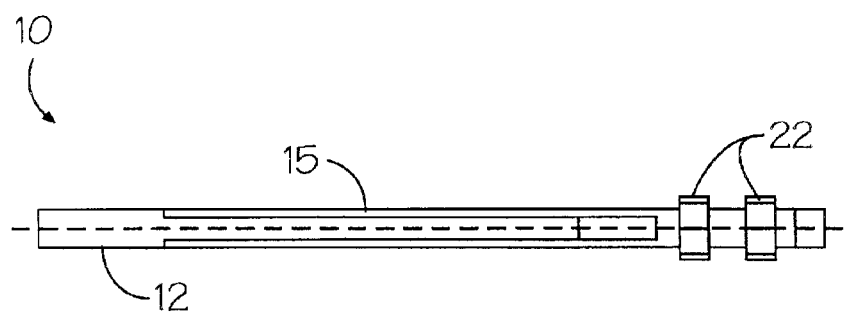
Figure 1B:
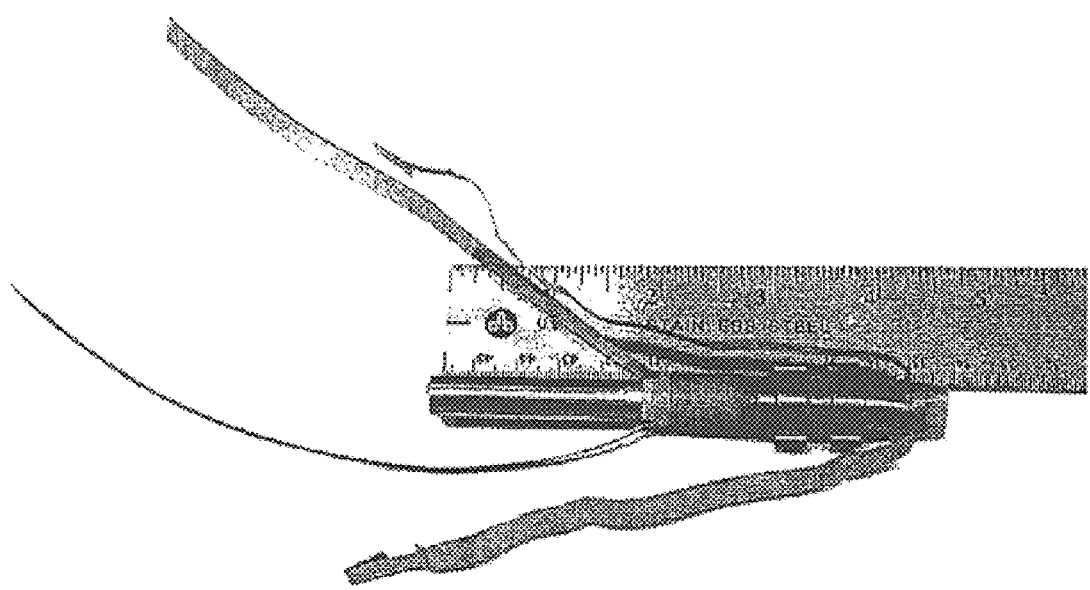

Now referring to FIGS. 1 and 1a, a sensing apparatus 10 of this invention is illustrated. FIG. 1b shows a photograph of the sensing apparatus 10 shown in FIGS. 1 and 1a. The sensing apparatus 10 comprises a number of composite layers 15 wrapped about the methanol flow tube 12. The composite of layered materials 15 is in contact with the analyte flow stream within the tube 12 through an aperture 14. The layered materials 15 sequentially wrapped on the tube 12 comprise: a polytetrafluoroethylene insulation sheet 16; an electrically conducting mesh which represents the anode current collector 17; a carbon-based material representing an anode diffusion medium 18; a catalyst-coated membrane 19 with both sides coated by catalysts such as Pt/Ru and Pt; a carbon-based material serving as the cathode diffusion medium 20; and an electrically conducting mesh representing the cathode current collector 21. The composite layers 15 of the sensing apparatus 10 are bent to the curved surface of the tube 12 and then fastened over the aperture 14 by clamps 22 (FIGS. 1 and 1a).

EXAMPLE

Figure 2:
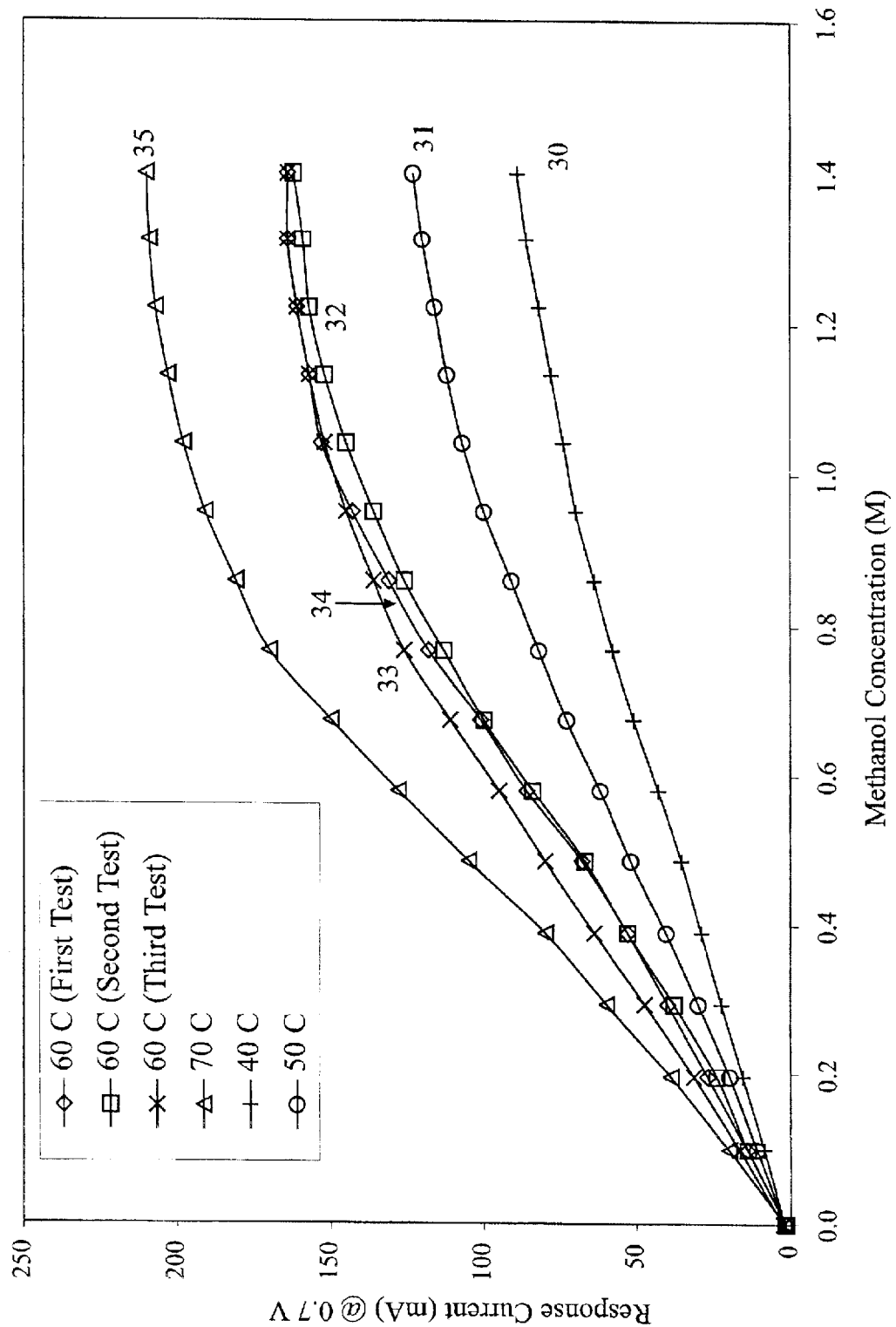
FIG. 2 depicts a graphical view of the response current vs. methanol concentration at various temperatures using the methanol sensing apparatus illustrated in FIG. 1b.
Figure 3:
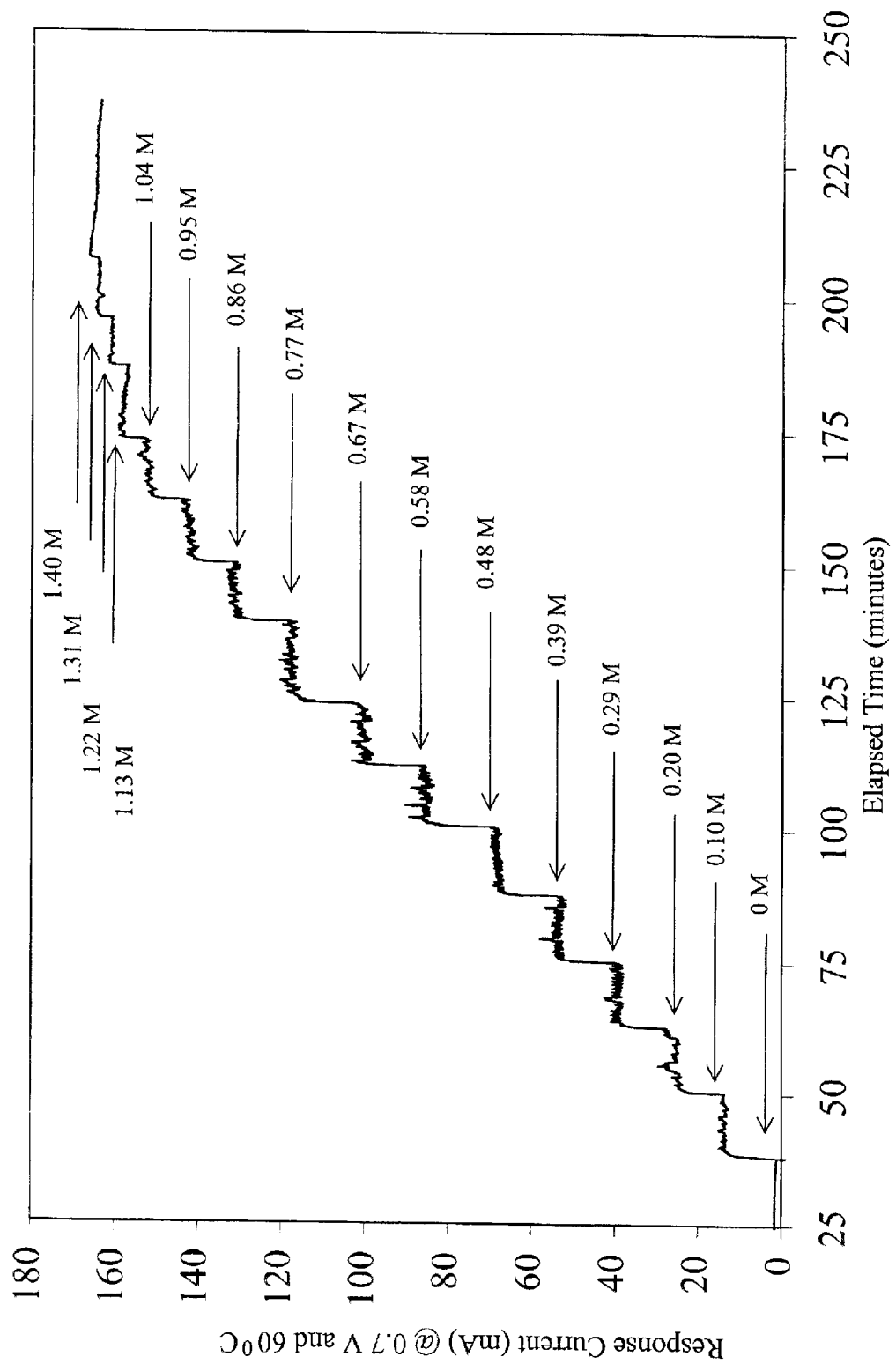
FIG. 3 depicts a graphical view of the response current vs. elapsed time for step change of methanol concentration at a temperature of 60° C. using the methanol sensing apparatus shown in FIG. 1b.
Figure 4:
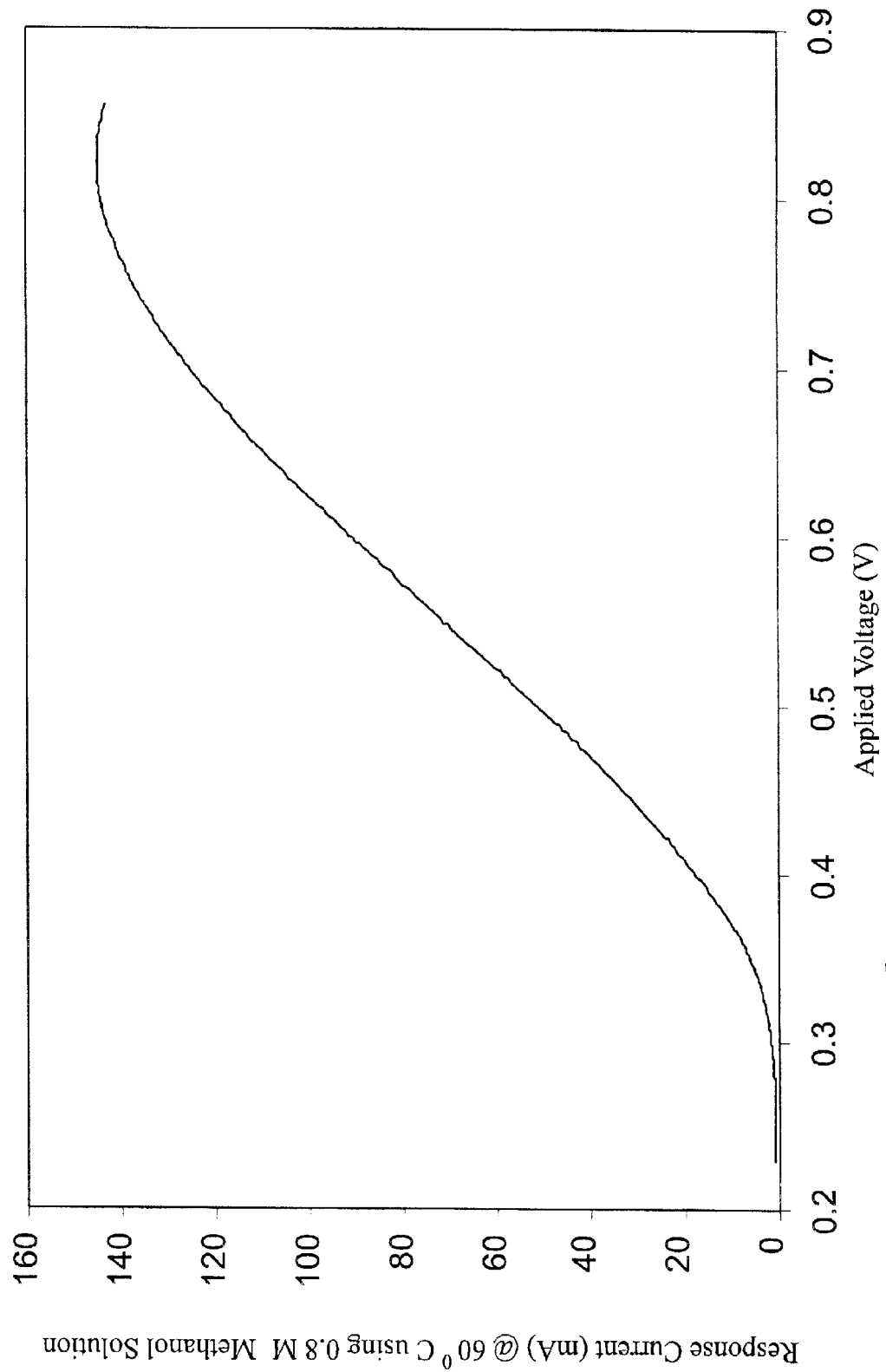
FIG. 4 illustrates a graphical view of the applied voltage vs. response current for a 0.8 M methanol solution at a temperature of 60° C. using the methanol sensing apparatus shown in FIG. 1b.
Figure 5:
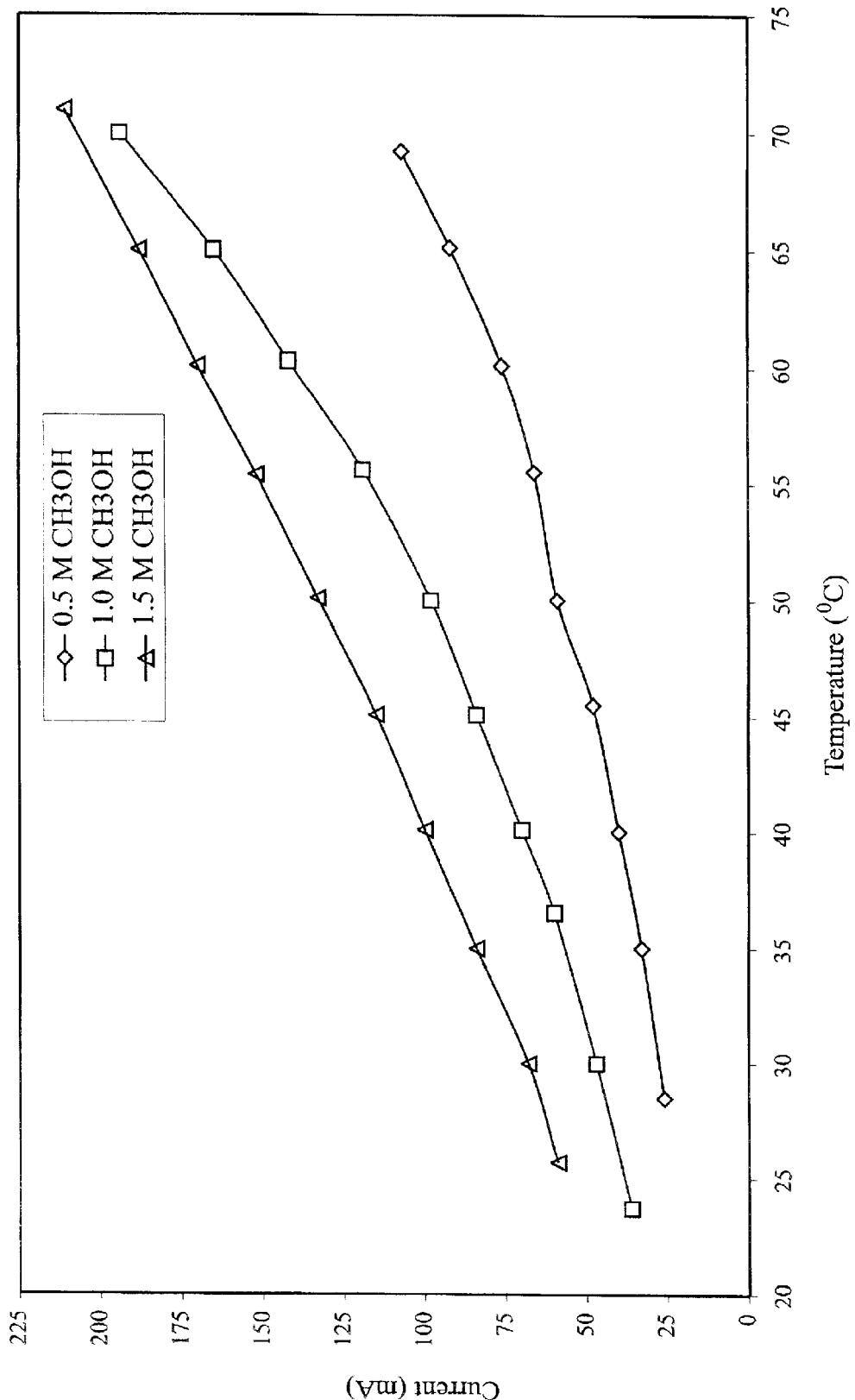
FIG. 5 shows a graphical view of the temperature vs. response current using the methanol sensing apparatus shown in FIG. 1b.

A sensing apparatus 10, made in accordance with FIGS. 1 and 1a, showed very high sensitivity to methanol concentration change. The sensor was connected within the methanol solution mixing tank. For a methanol concentration less than 1.4 M, the current response to the concentration change can be separated into two distinct regions. When the methanol concentration is between 0.0 and 0.8 M, the sensor shows highest sensitivities to the concentration of methanol and a linear current response exists. When the methanol concentration is between 0.9 and 1.4 M, another near-linear response is observed with slightly lower sensitivities, as illustrated in FIG. 2. A DMFC is most likely to be operated at a methanol concentration between 0.3 and 1.4 M so the sensing apparatus 10 is just suitable for such a concentration range. The sensor 10 showed good reproducibility results obtained at different times at 60° C. In addition, the current response of the sensor with methanol concentration change was very fast and quite stable as shown by FIG. 3. The responding current is related to the applied voltage, which needs to be higher than 0.3 V in order to generate enough current, as illustrated in FIG. 4. This threshold voltage is determined by the minimum overpotential needed to oxidize methanol. When the voltage is higher than 0.3 V, the current increases fast with the applied voltage. The highest voltage that can be applied depends on the stability of the catalyst. A catalyst containing Ru has been shown to limit the voltage not higher than 0.75 V in order to prevent Ru from dissolving. Temperature has a large effect on the responding current as expected from the methanol oxidation reaction and as illustrated in FIG. 5.

Figure 1C:
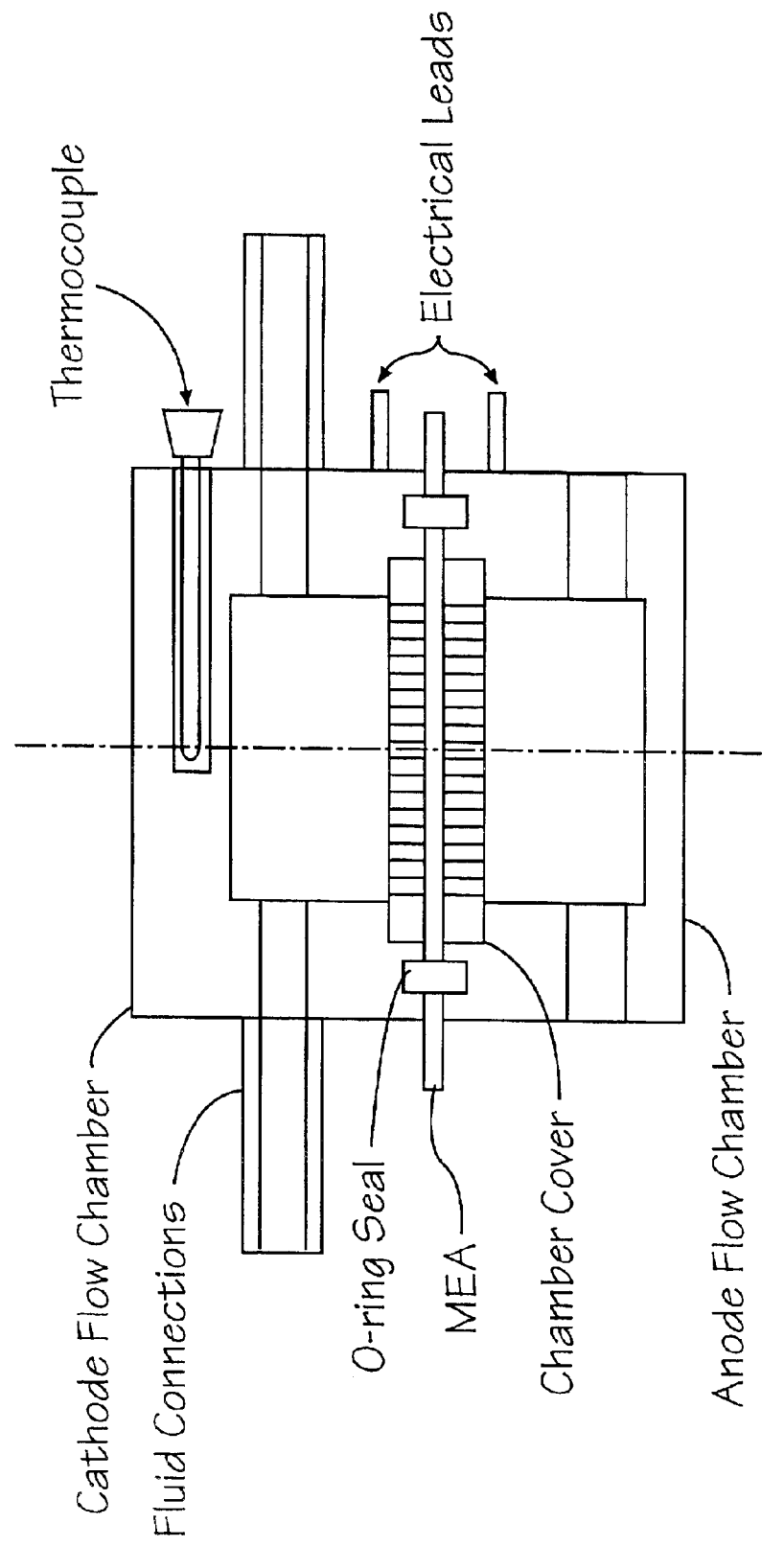
Figure 1F:
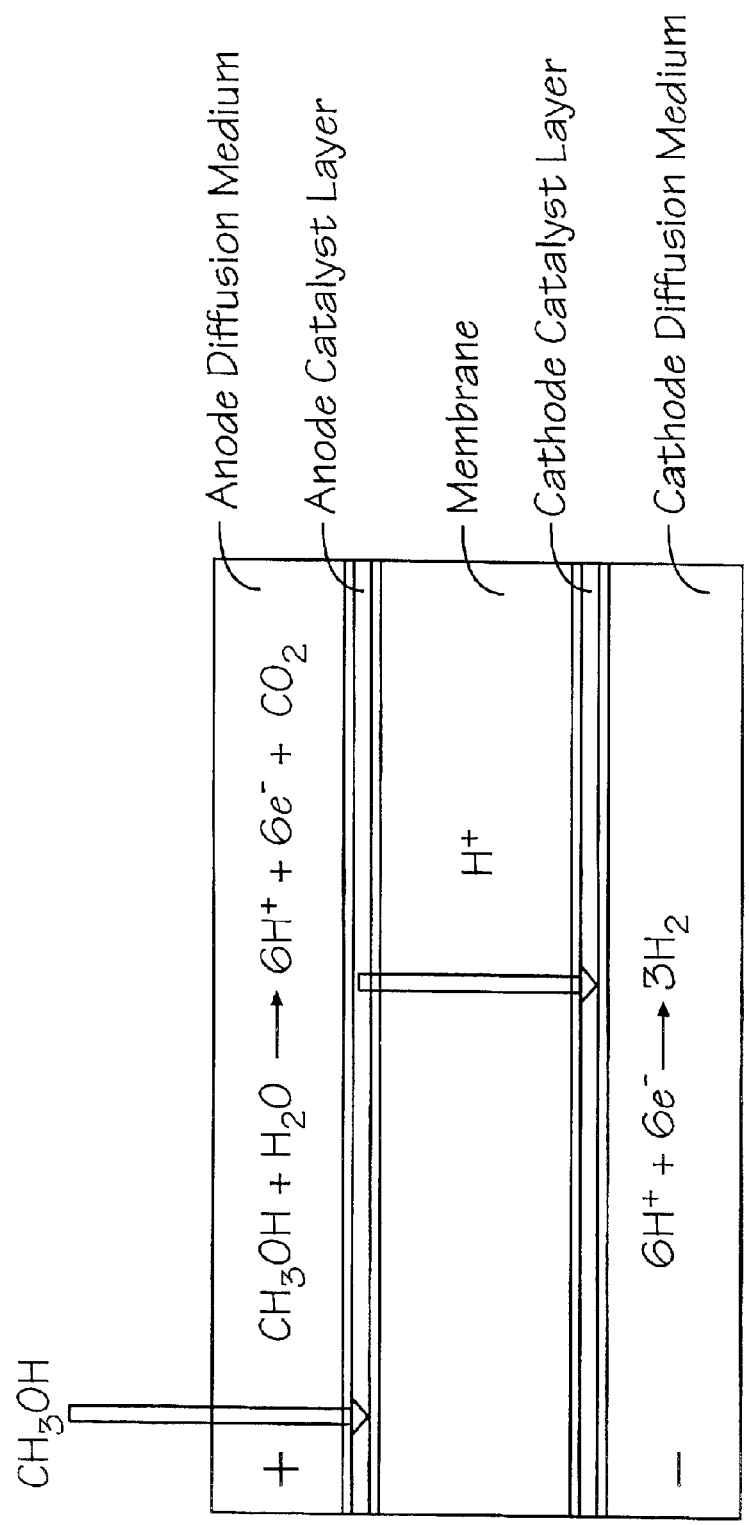

The sensing apparatus 10 is very simple and inexpensive to fabricate. In comparison, related methanol sensors fabricated by Barton et al and Narayanan et al have much greater complexity and are shown respectively in FIGS. 1c and 1e. Reaction locations for each of the aforementioned sensors are shown in FIGS. 1d and 1f, respectively.

Since other modifications and changes implemented to fit particular operating requirements and environments will be apparent to those skilled in the art, the invention is not considered limited to the example chosen for purposes of demonstration and covers all changes and modifications not constituting departures from the true spirit and scope of this invention.

Having thus described the invention, what is desired to be protected by Letters Patent is presented in the subsequently appended claims.

What is claimed is:

1. An apparatus for sensing the concentration of electro-active reactants in a reactant flow stream, comprising:

a) an elongated tube having an aperture in a side wall thereof;

b) a composite of flexible sensing layers having a direct sensing contact with said reactant flow stream through the said aperture, one of said flexible sensing layers of said composite comprising a catalyst-coated membrane; and c) fastening means for fastening said sensing layers over said tube adjacent said aperture, thereby providing a sensing apparatus conforming to a curvature of said tube.

2. The sensing apparatus in accordance with claim 1, wherein said sensing layer comprises in sequential order as layered over said tube:

a) an insulation layer;

b) a first current collector layer;

c) a first diffusion layer;

d) a catalyst-coated membrane layer;

e) a second diffusion layer; and f) a second current collector layer.

3. The sensing apparatus in accordance with claim 2, wherein said catalyzed membrane layer comprises a catalyzed surface directly facing said aperture and another catalyzed surface oppositely facing said aperture.

4. The sensing apparatus in accordance with claim 3, wherein Pt or its alloy is used to fabricate the catalyst layer bonded on said membrane.

5. The sensing apparatus in accordance with claim 2, wherein said first diffusion layer (c) comprises an anode diffusion layer.

6. The sensing apparatus in accordance with claim 2, wherein said second diffusion layer (e) comprises a cathode diffusion layer.

7. The sensing apparatus in accordance with claim 2, wherein each of said diffusion layers (c) and (e) comprises a carbon-based electrically conductive material.

8. The sensing apparatus in accordance with claim 2, wherein said insulation layer comprises polytetrafluoroethylene.

9. The sensing apparatus in accordance with claim 1, wherein said electro-active reactants are chosen from the group: methanol, ethanol, propanol, dimethoxymethane, and trimethoxymethane.

10. The sensing apparatus in accordance with claim 1, used to monitor analyte concentration for a direct-fuel cell.

11. The sensing apparatus in accordance with claim 1, used to monitor methanol concentration for a DMFC.

12. The sensing apparatus in accordance with claim 1, used to monitor the alcohol concentration for a direct alcohol fuel cell.

* * * * *